No. 772,490. Patented October 18, 1904.

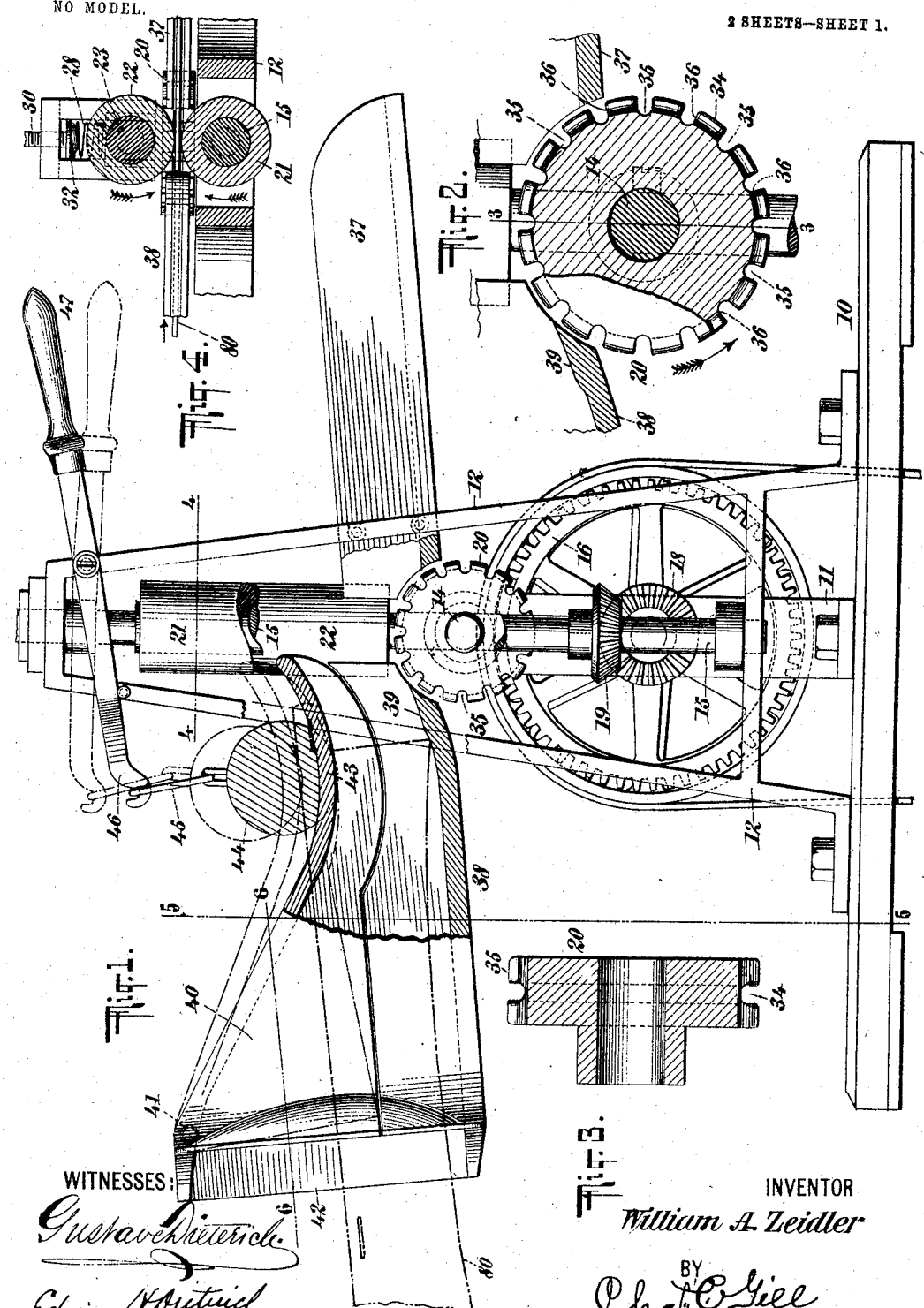

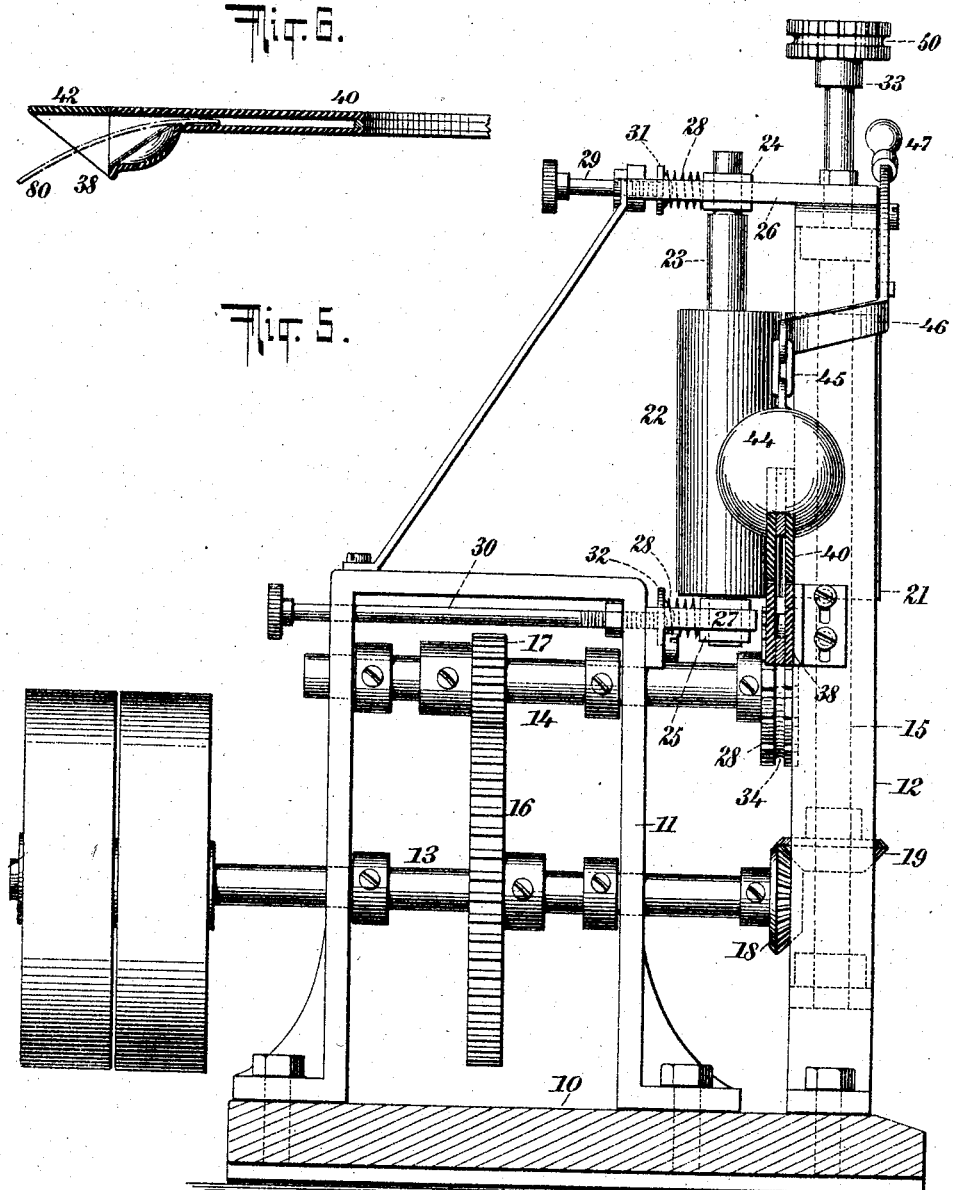

UNITED STATES PATENT OFFICE.

WILLIAM A. ZEIDLER, OF NEW YORK, N. Y., ASSIGNOR OF ONE-HALF TO GILBERT A. CLARK, OF NEW YORK, N. Y.

MACHINE FOR IRONING COLLARS OR CUFFS.

SPECIFICATION forming part of Letters Patent No. 772,490, dated October 18, 1904.

Application filed March 13, 1903. Serial No. 147,552. (No model.)

*To all whom it may concern:*

Be it known that I, WILLIAM A. ZEIDLER, a citizen of the United States, and a resident of New York, in the county of New York and State of New York, have invented certain new and useful Improvements in Machines for Ironing Collars or Cuffs, of which the following is a specification.

The invention relates to improvements in machines for ironing collars and cuffs; and the object of the invention is to afford adequate means for ironing the edges of collars and cuffs, the said articles prior to being subjected to the machine of my invention being ironed in the ordinary way and thereafter having their edges ironed and smoothed by being passed through the machine made the subject hereof.

In its preferred construction the machine of my invention comprises a pair of feed-rollers between which the collars and cuffs pass, a grooved ironing-roller which during the travel of the collars and cuffs between said feed-rollers engages, irons, and smooths the edges of the same, a feed-chute leading to the said feed-rollers for directing the collars and cuffs to said rollers, a delivery-chute leading from said feed-rollers, means for effecting a downward pressure upon the collars and cuffs in line with their edges while the latter are passing through the machine, means for rotating the feed-rollers in line with the desired direction of travel of the collars and cuffs, and means for rotating the grooved ironing-roller in a reverse direction, or in opposition to the direction of travel of the collars and cuffs, the whole being constructed and arranged as hereinafter described and claimed.

The invention will be fully understood from the detailed description hereinafter presented, reference being had to the accompanying drawings, in which—

Figure 1 is a side elevation, partly broken away, of a machine constructed in accordance with and embodying the invention. Fig. 2 is an enlarged sectional view, partly broken away, of the ironing-roller and feed and delivery chutes leading to and from the same. Fig. 3 is a vertical section through the ironing-roller on the dotted line 3 3 of Fig. 2. Fig. 4 is a horizontal section through a portion of the machine on the dotted line 4 4 of Fig. 1. Fig. 5 is an end elevation of the machine, the same being partly in section on the dotted line 5 5 of Fig. 1. Fig. 6 is a horizontal section through a portion of the machine on the dotted line 6 6 of Fig. 1.

In the drawings, 10 designates a suitable base supporting the general frames 11 12, in which are journaled the horizontal shafts 13 14 and vertical shaft 15. The shaft 13 is the power-shaft, and its motion is communicated to the shaft 14 through the gear-wheels 16 17, while the motion from the shaft 13 is communicated to the vertical shaft 15 by means of the beveled gear-wheels 18 19.

Upon the inner end of the shaft 14 is secured the ironing-roller 20, and upon the upper portion of the shaft 15 is secured the feed-roller 21, this feed-roller being substantially a counterpart of the vertical feed-roller 22, with which it coöperates and which is secured upon a vertical spindle or shaft 23, which is movable toward or from the roller 21. The upper and lower ends of the shaft 23 are mounted in bearing-blocks 24 25, which are adapted to slide in horizontal slots formed in bars 26 27, respectively, of the general frame of the machine. The blocks 24 25 are engaged by coiled springs 28, which press the blocks 24 25 and shaft 23 in a direction toward the vertical shaft 15, and thereby cause the roller 22 to engage the roller 21 under a yielding pressure. The tension of the springs, and consequently the degree of pressure that the roller 22 shall exert against the roller 21, may be regulated at will by means of the screws 29 30, the former engaging a plate 31 at the outer end of the spring 28 for the upper end of the shaft 23 and the screw 30 engaging a plate 32 for the spring 28 at the lower end of the shaft 23. The purpose of the springs 28 is to yieldingly press the roller 22 against the roller 21, so that said rollers may properly engage and feed the collars and cuffs, and it is desirable that the tension of the roller 22 may be capable of regulation, and hence I provide the adjusting-screws 29 30 for the springs 28, which exert their yielding force to press the roller 22 against the roller 21. The rollers 21 22 are substantially alike, and the roller 22 is driven by friction, while the roller 21 receives a positive rotation, through the shaft 15, from the power-shaft 13 and gear-wheels 18 19.

The upper end of the shaft 15 will preferably be provided with an ironing-roller 33, as shown in Fig. 5, which will be identical in construction with the ironing-roller 20, except that it will preferably be smaller in size than said roller 20.

The roller 20 is centrally below the division-line between the vertical feed-rollers 21 22, and this roller 20 is formed around its periphery with the annular groove 34, which is crossed by the series of transverse grooves 35, extending from one edge to the other of the periphery of said wheel 20, as shown in Figs. 2 and 3, these transverse grooves 35 being slightly greater in depth than the annular groove 34, whereby there are formed at the base of the groove 34, between the transverse grooves 35, definite ironing-surfaces 36, which set outward from the base of the transverse grooves 35. In the employment of the machine the collars and cuffs are fed by means of the rollers 21 22, and while being thus positively moved the edges of the articles lie within the annular groove 34 of the roller 20 and are acted upon by the ironing-surfaces 36 of said roller for the purpose of smoothing and ironing said edges, and it is to be observed that the rollers 21 22 are geared to feed the collars and cuffs outwardly into a delivery-chute 37, while the ironing-roller 20 is geared to rotate in the reverse direction, or toward a feed-chute 38, the roller 20 thus being compelled to rotate against the edge of the collar in opposition to the movement through the machine of said collar.

The feed-chute 38 is simply a vertically-disposed trough open at its outer end to receive the collars and cuffs and direct them on edge to the feed-rollers 21 22, by which the articles are carried through the machine and delivered to the exit-trough 37, which is simply an open box-trough of convenient dimensions to receive the collars and cuffs one after another as they leave the feed-rollers 21 22, one purpose of the delivery-trough 37 being to support the advancing end of the collar or cuff when necessary, while the other end or portion thereof is between and moving through the rollers 21 22. The inner end of the base of the chute 37 is entirely below the upper edge of the ironing-roller 20, while the base of the chute 38 is formed at its inner end with an elevated portion 39, which leads upwardly into close relation to the upper edge of the roller 20 and serves to deliver the advancing end of the collar (represented by the dotted lines 80) to the base of the annular groove 34 in said roller. The form of the delivery chute or trough 37 is practically unimportant; but it is advantageous to provide the base of the feed-chute 38 with the elevated portion 39 at its inner end, as will appear more fully hereinafter.

The upper longitudinal portion of the feed-chute 38 is formed with a movable section 40, hinged by a pin 41 to a stationary part 42, extending upwardly from the lower rigid portion of the feed-chute. The hinged portion 40 of the feed-chute has a downwardly and inwardly curved top 43, whose inner end leading to the feed-rollers 21 22 turns upwardly, and upon the top 43 of said hinged portion 40 is secured a weight 44, which presses the inner end of the hinged section 40 downwardly, so that the lower surface of its top 43 will press against the collars and cuffs while the latter are traveling through the feed-chute 38 and rollers 21 22. In Fig. 1 I illustrate the hinged section 40 and weight 44 in their lower position by full lines and in their upper operative position by dotted lines. Upon the insertion of a collar into the narrow feed-chute 38 its lower edge will engage the base of said chute and its upper edge will press against and elevate the hinged section 40 and weight 44 into the position in which said parts are shown by dotted lines in Fig. 1, and this has the effect of securing a downward pressure against the collar while it is traveling to and passing between the rollers 21 22. The weight 44 is connected by a link 45 with one end of a lever 46, having a handle 47 at its other end. Ordinarily the lever 46 will not be made use of for elevating the weight 44 and hinged section 40, because the collars will ordinarily be stiff enough to, when passed by hand into the mouth of the chute 38, elevate or turn upwardly the hinged section 40; but the lever 46 will be found to be useful in the event that a pretty tall collar or cuff is to be passed through the machine. If a very tall collar or cuff is passed into the chute 38, it might strike the top 43 of the hinged section 40 so nearly at the outer end of the latter as to make it impossible for the section 40 to turn upwardly under the pressure thereof, and in such event the attendant will upon feeding the tall collar or cuff to the chute 38 grasp the handle 47 and move the same downwardly for the purpose of thereby elevating the weight 44 and hinged section 40 and then after the tall collar or cuff is fairly within the chute 38 releasing the lever 46, so that the weight 44 may exert its downward pressure against the same. The space between the side walls of the chute 38 and hinged section 40 is narrow, as shown in Figs. 5 and 6, and hence the collars and cuffs will always remain on edge while passing through said chute.

In the employment of the machine made the subject hereof the collars and cuffs will be fed one following the other to the chute 38, being fed into said chute by hand until the forward end of the collar or cuff reaches and is caught by the feed-rollers 21 22, which being in motion will draw the collars and cuffs through the machine and discharge them into the exit chute or trough 37. While the collars and cuffs are passing through the machine their lower edge will be held within the annular groove 34 of the ironing-roller 20, and this roller being in motion its ironing-surfaces 36 will engage the said lower edge of the collars and cuffs and smooth and iron the same, removing all roughness from said edges and leaving the same in condition to be worn. The lower edges of the collars and cuffs are guided to the annular groove 34 of the roller 20 by means of the chute 38 and its base, and during the movement of the collars and cuffs they are held downwardly by means of the weight 44 and hinged section 40 of the feed-chute. It is desirable that the lower edge of the collar be elevated to almost the level of the base of the annular groove 34 of the roller 20 before the feed-rollers 21 22 actually engage the collar and start to pull the same through the machine, and this is especially true where the collar has at its end, as shown in Fig. 1, a projecting buttonhole-tab to be caught by the rollers 21 22 before the lower edge of the collar has reached the roller 20, and it is to effect this elevating of the lower edge of the collar somewhat in advance of the engagement of the rollers 21 22 with the collar that the elevated portion 39 is provided in the base of the chute 38 adjacent to the roller 20. It will be seen upon reference to Fig. 1 that the collar will pass up the elevated surface 39 and get into a position to properly enter the annular groove 34 of the roller 20 before the rollers 21 22 engage the tab or buttonhole projecting part of said collar. During the travel of the collars through the machine the roller 20 rotating in a direction against the movement of the edges thereof has a tendency to force the collars upwardly, and this is resisted by the weight 44, which holds the collar downwardly with a yielding pressure, so that the collar while being carried through the machine by means of the rollers 21 22 is kept in contact with the ironing-surfaces 36 of the roller 20. The collars and cuffs before being fed to the machine described will be ironed in the ordinary way and thereafter will be fed to the present machine in order that their edges may be ironed and smoothed.

There are some edges of collars and cuffs which may not be smoothed by being passed through the present machine—such, for instance, as the vertical end edges of the collar shown in Fig. 1—and in order to enable the attendant to properly iron and smooth such edges of the collars and cuffs I provide the supplemental ironing-roller 33 upon the upper end of the shaft 15, as shown in Fig. 5. It will be an easy matter for the attendant as the collars and cuffs pass from the feed-rollers 21 22 to subject any of their edges not reached by the roller 20 to the roller 33, she holding the collar or cuff so its unironed edges will lie within the annular groove 50 of the said roller 33, the latter being in rotation and deriving its movement from the shaft 15. The roller 33 is a duplicate of the roller 20, except that it is somewhat smaller than the roller 20.

I regard the ironing-roller 20 having the annular and transverse grooves on its periphery as of especial importance on account of its efficiency in smoothing the edges of collars and cuffs without injury to the same, and while I do not limit my invention in every instance to the special construction of roller 20, hereinbefore described, I do recommend that construction. Except for convenience in manufacturing, the transverse grooves 35 need not extend from side to side of the roller 20, since it is only those portions of said grooves which traverse the annular groove 34 that become important in forming the series of ironing-surfaces 36 within said annular groove in accordance with my invention, said groove 34 in operation receiving the edge of the collar or cuff and said ironing-surfaces 36 acting upon said edge. The end edges of ironing-surfaces 36 should be rounded off a little, so that they may not injure the edge of the collar or cuff, and the bottom of the annular groove 34 should be concave in cross-section.

It will be observed on reference to Fig. 1 that the feed-chute 38 is inclined upwardly and that the collars fed along the chute will when their forward ends are gripped by the rollers 21 22 have their outer portions on a plane below the bottom of the groove 34 of the roller 20, the result of which is that the roller 20 while acting against the lower edge of a collar will operate as a point of resistance to the collar and force the same to travel on an upward inclination between the rollers 21 22, the latter resisting upward movement of the collar from the roller 20. I regard it as of material benefit that the collars are compelled to travel on an inclined path to and between the rollers 21 22 and to the ironing-roller 20, since by reason thereof the said roller 20 is compelled to properly iron the longitudinal edge of the collar. I also regard it as material in the best form of my invention that the ironing-surfaces 36 of the roller 20 be of elongated form, as shown, each surface 36 being preferably about twice as long as the distance across one of the grooves 35, whereby about two-thirds of the periphery of the roller 20 present effective ironing-surfaces.

I do not limit my invention to the specific weight 44 and connections shown for aiding in keeping the advancing collar on its proper inclined path.

What I claim as my invention, and desire to secure by Letters Patent, is—

1. An edge-ironing machine comprising a fixed grooved ironing-roller and means for rotating the same, combined with the upwardly-inclined feed-chute for receiving the collar or cuff on edge and leading to the groove of said roller, and means for engaging and feeding the collar or cuff on an inclined path along said chute and to said roller, said roller acting to iron the edge of the collar or cuff and serving as a point of resistance at the upper end of said chute for compelling the collar or cuff to continue on its inclined path; substantially as set forth.

2. In an edge-ironing machine, the grooved ironing-roller, and means for rotating the same, combined with the inclined feed-chute leading to the groove of said roller, rollers 21, 22 for engaging the opposite faces of the collar or cuff, and additional means for engaging the collar or cuff at a point intermediate said rollers 21, 22 and the entrance to said feed-chute for aiding in compelling the collar or cuff to travel on its inclined path, said grooved roller acting to iron the edge of the collar or cuff and serving as a point of resistance at the exit end of said feed-chute for compelling the collar or cuff to continue on its inclined path; substantially as set forth.

3. In an edge-ironing machine, the grooved ironing-roller, and means for rotating the same, combined with the inclined feed-chute 38 leading to said roller and having adjacent to said roller the deflected inner end portion 39, rollers 21, 22 for engaging the opposite faces of the collar or cuff, and additional means for engaging the collar or cuff at a point intermediate said rollers 21, 22 and the entrance to said feed-chute for aiding in compelling the collar or cuff to travel on its inclined path, said grooved roller acting to iron the edge of the collar or cuff and serving as a point of resistance at the exit end of said feed-chute for compelling the collar or cuff to continue on its inclined path; substantially as set forth.

4. In an edge-ironing machine, the ironing-roller having on its periphery the concave annular groove and transverse grooves and affording within said annular groove and between said transverse grooves the elongated ironing-surfaces, and means for rotating said roller; substantially as set forth.

5. In an edge-ironing machine, the ironing-roller having on its periphery the concave annular groove and transverse grooves and affording within said annular groove and between said transverse grooves the elongated ironing-surfaces, and means for rotating said roller, combined with means for feeding a collar or cuff with its edge to said ironing-surfaces; substantially as set forth.

6. In an edge-ironing machine, the ironing-roller having on its periphery the concave annular groove and transverse grooves and affording within said annular groove and between said transverse grooves the elongated ironing-surfaces, and means for rotating said roller, combined with means for feeding the collars and cuffs on an inclined path to said ironing-roller and yieldingly holding the collar or cuff with the edge against said roller; substantially as set forth.

7. The ironing-machine comprising the feed-rollers, combined with the ironing-roller for engaging and ironing the edge of the collar or cuff while the latter is being fed onward by said feed-rollers, means for rotating said rollers, the feed-chute leading to said feed-rollers and ironing-roller and having the weighted yielding section for engaging one edge of the collar or cuff during the travel of the latter through the machine; substantially as set forth.

8. An edge-ironing machine comprising the grooved ironing-roller, and means for rotating the same, combined with the upwardly-inclined feed-chute for receiving the collar or cuff on edge and leading to the groove of said roller, the upwardly-inclined delivery-chute 37 at the discharge side of said roller, rollers 21, 22 for engaging the opposite faces of the collar or cuff, and additional means for engaging the collar or cuff at a point intermediate said rollers 21, 22 and the entrance to said feed-chute for aiding in compelling the collar or cuff to travel on its inclined path, said grooved roller acting to iron the edge of the collar or cuff and serving as a point of resistance at the exit end of said feed-chute for compelling the collar or cuff to continue on its inclined path; substantially as set forth.

Signed at New York, in the county of New York and State of New York, this 12th day of March, A. D. 1903.

WILLIAM A. ZEIDLER.

Witnesses:
ARTHUR MARION,
CHAS. C. GILL.